No. 898,234. PATENTED SEPT. 8, 1908.
W. T. LISENBY.
WASTE PIPE CLEANER.
APPLICATION FILED JUNE 25, 1906.
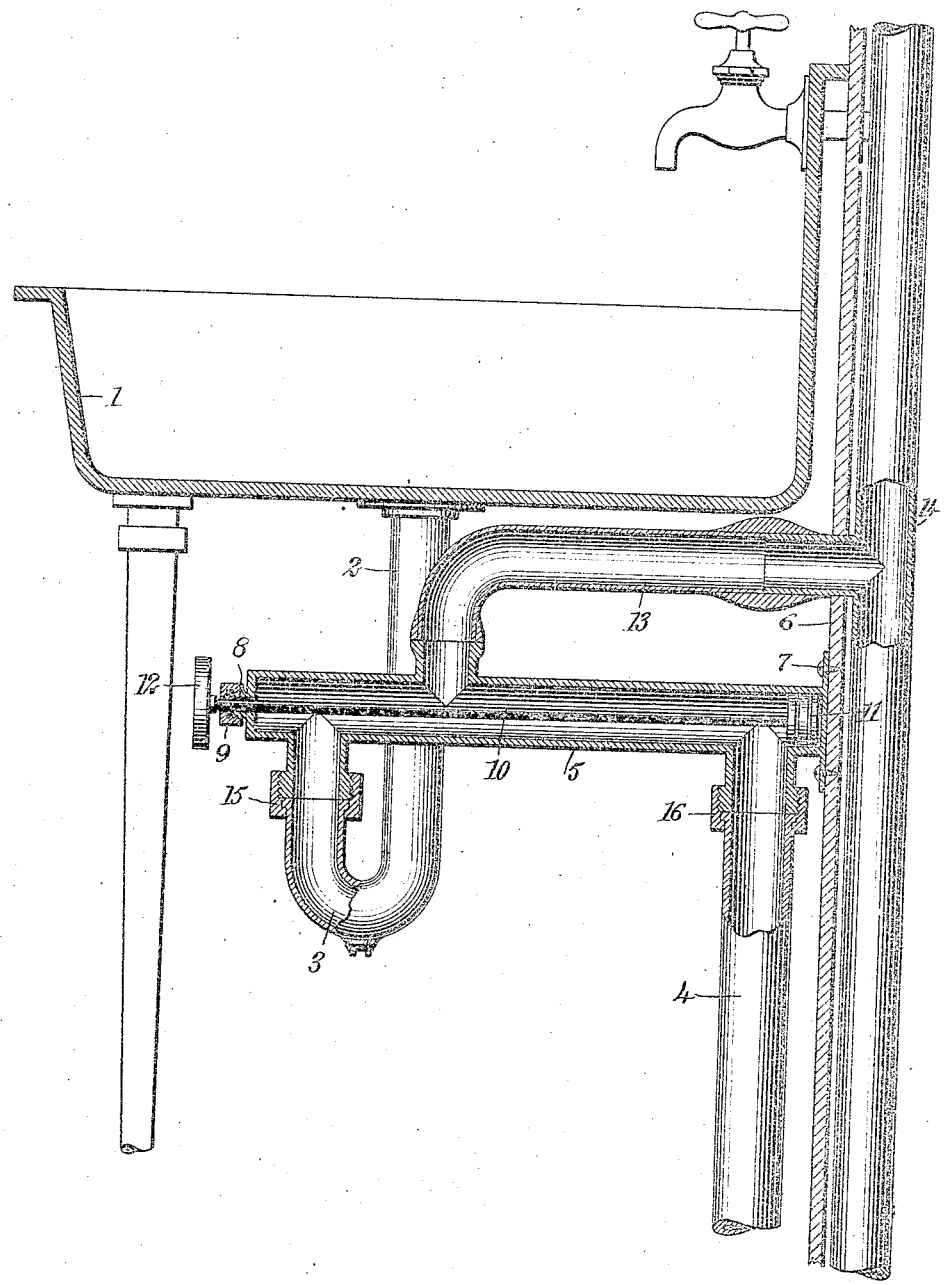
WITNESSES
INVENTOR
William T. Lisenby
BY
ATTORNEYS

UNITED STATES PATENT OFFICE.

WILLIAM THOMAS LISENBY, OF LONGBEACH, CALIFORNIA.

WASTE-PIPE CLEANER.

No. 898,234.        Specification of Letters Patent.        Patented Sept. 8, 1908.

Application filed June 25, 1906. Serial No. 323,241.

*To all whom it may concern:*

Be it known that I, WILLIAM THOMAS LISENBY, a citizen of the United States, and a resident of Longbeach, in the county of Los Angeles and State of California, have invented a new and Improved Waste-Pipe Cleaner, of which the following is a full, clear, and exact description.

This invention is an improvement in waste pipe cleaners, having among other objects, the provision of an effective means for instantly unchoking and cleansing waste pipes which become clogged with paper, grease or other foreign substance.

One embodiment of the invention consists of a cylinder in which a piston is adapted to reciprocate, said cylinder being connected at opposite ends, respectively by the waste pipe and the pipe leading to the sewer, whereby as the piston is reciprocated any material which might become lodged in the pipes, is positively forced out.

Reference is to be had to the accompanying drawing in which the figure represents in side elevation, partly in section, one embodiment of my improvement as applied to the waste pipe of a kitchen sink.

The numeral 1 indicates any desired form of kitchen sink connected by the usual waste pipe 2, carrying a trap 3 at its lower end, of any preferred construction. A discharge pipe 4 leading to the sewer connects with the trap through the intermediary of a horizontally disposed cylinder 5 secured to a wall 6 by means of screws passing through a flanged base 7 at the rear end of the cylinder. The opposite end of the cylinder 5 is provided with a threaded extension 8 on which is screwed a packing nut 9, both the extension and nut being apertured to receive a piston rod 10, said piston rod having fixed to it at its inner end in the cylinder 5 a piston head 11, and at its opposite end on the outside of the cylinder, a suitable handle 12, that shown being disk-shaped, which will be found preferable in some constructions.

Intermediate the connection of the trap 3 with the cylinder 5 and the connection of the pipe 4 with said cylinder, is a third pipe 13 leading from the top of the cylinder and into a vertical pipe 14 forming a vent pipe to conduct the gases to the outer atmosphere. Suitable threaded connections with the trap 3 and the pipe 4, as at 15 and 16, will ordinarily be provided, in order that my improvement may be readily attached thereto.

When the device is not in use, the elements thereof will normally occupy the position shown in the drawing figure, sufficient space being left between the base plate 7 of the cylinder and the connection of the pipe 4 to prevent the piston head 11 from overlapping and obstructing the pipe 4 leading to the sewer. Should the trap, cylinder or pipe leading to the sewer become clogged or choked up, the handle 12 is drawn forwardly, causing the piston head to first create a suction in the pipe 4 until it passes the vent pipe 13, at which point it compresses the air or gas in that part of the cylinder beyond it, forcing any obstruction in the cylinder or trap 3 up through the waste pipe. Water will then pass through the trap to the front of the piston, which, when moved in the opposite direction, will force it, in connection with any foreign substance, down through the pipe 4 leading to the sewer. Should one reciprocation of the piston fail to unchoke the pipe, the operation should be repeated until all the pipes are free.

Although I have shown my improvement in connection with a pipe leading from the kitchen sink, it is to be understood that it might be used in connection with waste pipes leading from other sources, inasmuch as the scope of the invention is limited by the annexed claims only.

Having thus described my invention I claim as new and desire to secure by Letters Patent:

1. A cylinder having a piston adapted to be reciprocated therein, a waste pipe leading to the cylinder near one end thereof, a discharge pipe leading from the cylinder near its opposite end, and a vent pipe leading from the cylinder intermediate the waste pipe and discharge pipe.

2. In combination with a kitchen sink or the like, a cylinder arranged below the same having a piston therein adapted to be reciprocated, a waste pipe leading from the sink to the cylinder, a discharge pipe leading from the cylinder, and a vent pipe leading from the cylinder intermediate the waste pipe and discharge pipe.

3. In combination with a kitchen sink or the like, a cylinder having a piston adapted to be reciprocated therein, a trap independent of the cylinder and connecting the sink with the cylinder, and a discharge pipe leading from the cylinder.

4. In combination with a kitchen sink or the like, a cylinder arranged approximately in a horizontal position thereunder, a waste pipe leading from the sink to a point near one end of the cylinder, a discharge pipe leading from a point near the other end of the cylinder, and a piston slidable in the cylinder for forcing the products passing therein through the waste pipe to the discharge pipe.

5. In combination with a kitchen sink or the like, a cylinder arranged in an approximately horizontal position under the sink, a piston slidable in the cylinder, a waste pipe leading from the sink to a point near one end of the cylinder, and a discharge pipe leading from the cylinder at a point near the opposite end thereof, said points being so located that the communication of the waste pipe and of the discharge pipe with the cylinder will be unobstructed by the piston when said piston is moved to its extreme positions.

6. In combination with a kitchen sink or the like, a cylinder located thereunder in an approximately horizontal position and provided with a piston, a waste pipe leading from the sink having a trap connected with the cylinder and independent thereof, and a discharge pipe leading from the cylinder.

In testimony whereof I have signed my name to this specification in the presence of two subscribing witnesses.

WILLIAM THOMAS LISENBY.

Witnesses:
 JNO. H. KENNER,
 A. R. PORTERFIELD.